(12) United States Patent
Jacobs

(10) Patent No.: US 10,587,952 B2
(45) Date of Patent: Mar. 10, 2020

(54) MICROPHONE SYSTEM FOR NOTEBOOK COMPUTER

(71) Applicant: Intel Corporation, Santa Clara, CA (US)

(72) Inventor: Robert Jacobs, Portland, OR (US)

(73) Assignee: Intel Corporation, Santa Clara, CA (US)

(*) Notice: Subject to any disclaimer, the term of this patent is extended or adjusted under 35 U.S.C. 154(b) by 620 days.

(21) Appl. No.: 14/074,450

(22) Filed: Nov. 7, 2013

(65) Prior Publication Data
US 2015/0125022 A1 May 7, 2015

(51) Int. Cl.
*H04R 3/00* (2006.01)
*H04N 5/225* (2006.01)
*H04R 1/40* (2006.01)

(52) U.S. Cl.
CPC ........... *H04R 3/005* (2013.01); *H04N 5/2252* (2013.01); *H04R 1/406* (2013.01); *H04R 2430/23* (2013.01); *H04R 2499/15* (2013.01)

(58) Field of Classification Search
CPC .............................. H04R 1/028; H04N 5/2252
USPC ................................................... 381/355, 341
See application file for complete search history.

(56) References Cited

U.S. PATENT DOCUMENTS

| | | | | |
|---|---|---|---|---|
| 6,151,206 A * | 11/2000 | Kato | ...................... | G06F 1/1601 361/679.23 |
| 6,778,963 B2 * | 8/2004 | Yamamoto | .......... | B60R 11/0229 704/275 |
| 2009/0111536 A1 * | 4/2009 | Tanaka | ................ | H04M 1/0212 455/575.3 |
| 2009/0245565 A1 * | 10/2009 | Mittleman | ............ | H04M 1/035 381/365 |
| 2010/0208907 A1 * | 8/2010 | Ukai | ........................ | H04R 3/02 381/66 |
| 2012/0001875 A1 * | 1/2012 | Li | .......................... | G01S 7/5273 345/177 |
| 2013/0289792 A1 * | 10/2013 | Cheng | ................ | G05D 23/1919 700/300 |
| 2013/0329915 A1 * | 12/2013 | Andre | .................... | H04R 1/222 381/122 |
| 2014/0028777 A1 * | 1/2014 | Koberling | ............ | H04N 5/2251 348/14.01 |
| 2014/0079227 A1 * | 3/2014 | Kim | ........................ | H03G 3/32 381/57 |

* cited by examiner

*Primary Examiner* — Sean H Nguyen
(74) *Attorney, Agent, or Firm* — Spectrum IP Law Group LLC

(57) ABSTRACT

Briefly, in accordance with one or more embodiments, a display includes a housing comprising a first surface and a second surface opposite to the first surface. The second surface comprises a transparent material covering the second surface and the housing includes two or more microphone ports disposed along a parting line between the first surface and the second surface exterior to the transparent material. The housing further includes two or more microphones coupled with the two or more microphone ports. A microphone signal processing system may be utilize to increase directional sensitivity of the two more microphones toward an audio source. An angle detector to detect an angle of the may be utilized to accommodate the directional sensitivity provided by the microphone signal processing system.

19 Claims, 5 Drawing Sheets

MICROPHONE SYSTEM FOR NOTEBOOK COMPUTER

BACKGROUND

In modern notebook and Ultrabook™ designs, microphone selection, placement and system design should optimize the user experience for speech recognition and audio/video conferencing. Typical system designs included a plastic or metal bezel surrounding the front glass or clear plastic of the display which allowed the microphone ports to be realized as simple openings or holes in the bezel that could be fabricated as part of the injection mold or metal fabrication process.

More recent designs, however, forgo the utilization of the bezel such that the front glass or surface covers the entire front display surface, also known as the B surface of a clamshell design. In order to provide microphone ports, holes could be drilled into the front glass or clear plastic where the original holes in the bezel were located for the microphone ports, but such drilling involves additional manufacturing steps for making the front glass or clear plastic and may result in manufacturing fallout of the front glass or clear plastic and/or of any included touch screen components, resulting in increased production costs.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
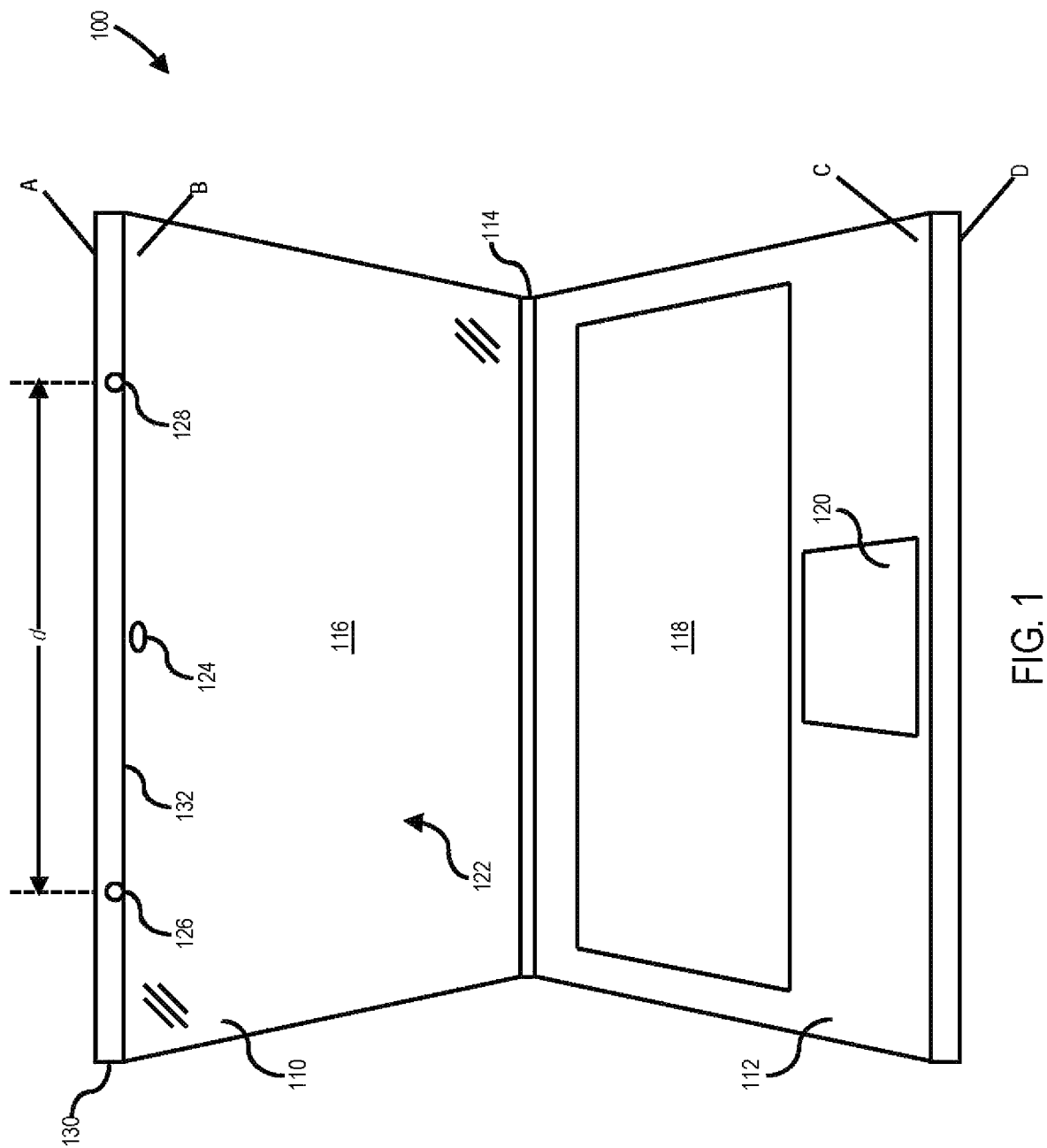
FIG. 1 is a front isometric view of a notebook computer in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a front isometric view of a notebook computer in accordance with one or more embodiments in accordance with one or more embodiments will be discussed. As shown in FIG. 1, notebook computer 100 may comprise a display unit 110 and a keyboard unit 112 coupled via a hinge 114 in a clamshell type design such that the display unit 110 is capable of being rotated about an axis of hinge 114 with respect to keyboard unit 112 so that notebook computer 100 may be opened or closed and so that display unit 110 may be moved into a position suitable for use. Although a notebook computer 100 having a clamshell design is discussed herein for purposes of example, notebook computer 100 may have other designs such as a convertible design where hinge 114 allows display unit 110 to be rotated about two axes to allow a tablet style configuration, or a detachable design wherein display unit 110 may be detachable from keyboard unit 112, among other examples. It should be noted that the scope of the claimed subject matter is not limited in these respects. In some embodiments, notebook computer 100 may include a keyboard 118 and a track pad 120 to provide keyed input and mouse control and input. Optionally, track pad 120 may include input buttons underneath track pad 120 such that pushing on one or more selected regions of track pad 120 depresses the input buttons. Alternatively, although not shown in FIG. 1, input buttons may be disposed adjacent to track pad 120. Display unit 110 may include a display 116 for displaying information to a user, for example via a graphical user interface. In general, notebook computer 100 may have four major surfaces: the A surface, the B surface, the C surface, and the D surface. The A surface comprises the top back surface of display unit 110, the display 116 is viewable on the B surface, the keyboard 118 and track pad 120 are disposed on the C surface, and the D surface is the bottom surface.

The notebook computer 100 may have a front surface 122 disposed on surface B comprising a transparent material such as glass or plastic through which display 116 may be viewed. In one or more embodiments, front surface 122 may cover the B surface entirely or nearly entirely. A camera 124 may be disposed on front surface 122 near the parting line 132 at the interface 130 between the A surface and the B surface. Since the front surface 122 is transparent, camera 124 may be disposed behind front surface 122 and still function properly. Two or more microphone ports 126 and 128 may be disposed at or near the parting line 132 on interface 130 between surface A and surface B just outside the front surface 122 to allow sound to be captured and directed to respective microphones as shown in and described with respect to FIG. 3, below. Microphone port 126 and microphone port 128 may be disposed at a distance, d, apart from one another as shown. Microphone ports 126 and 128 may be disposed at the parting line 132 between front surface 122 at the interface 130 between front surface 122 and the A surface, wherein the interface 130 may be part of the A surface such that microphone ports 126 and 128 may be fabricated as part of the molding or machining of the A surface rather than being drilled through the glass or clear plastic material of front surface 122. Although two microphone ports 126 and 128 are shown for two microphones, any number of microphone ports and microphones may be provided, wherein the number of microphone parts may or may not be the same as the number of microphones, and the scope of the claimed subject matter is not limited in this respect.

Figure 2:
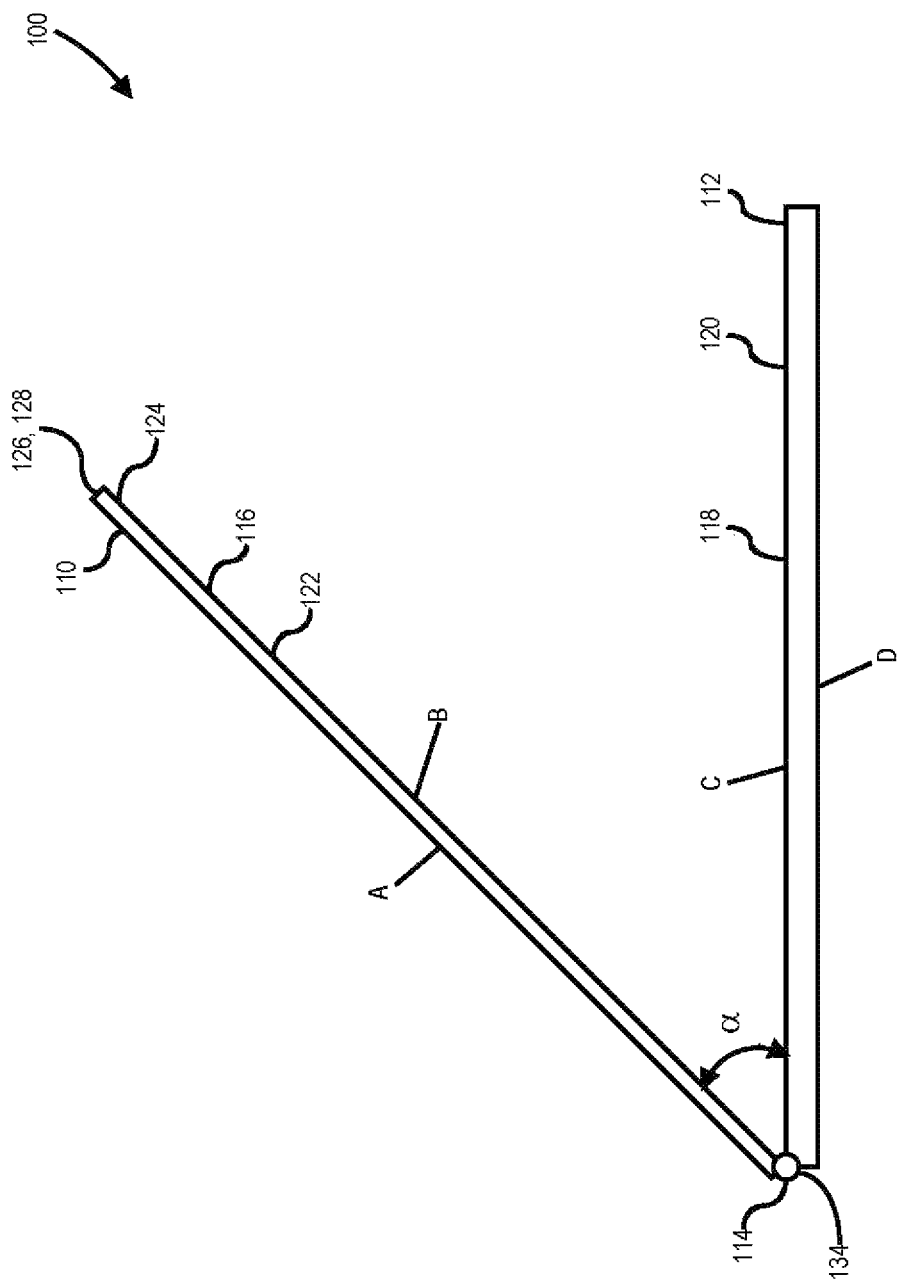
FIG. 2 is a side elevation view of the notebook computer of FIG. 1 in accordance with one or more embodiments.

Referring now to FIG. 2, a side elevation view of the notebook computer of FIG. 1 in accordance with one or more embodiments will be discussed. FIG. 2 shows notebook computer 100 of FIG. 1 from a side perspective. Display unit 110 may be rotated at an angle, α, with respect to keyboard unit 112 via rotation about hinge 114. An angle sensor 134 may be included in or coupled with hinge 114 to detect the angle, α, for example via an electrical sensor or optical sensor. An example electrical sensor may comprise a potentiometer or variable resistor having a resistance value proportional to the amount of rotation of the potentiometer or the variable resistor, so that a current flowing through the potentiometer may generate a voltage proportional to the angle, α. An example optical sensor may allow an amount of light to pass through to an electro-optical sensor based on rotation of an actuator. Greater rotation allows more light to impinge on the electro-optical sensor such that the sensor outputs a signal proportional to the amount of rotation. Another embodiment for angle sensor 134 may include an accelerometer to measure to measure angle, α, relative to gravity. These are merely examples of different types of angle sensor 134, and the scope of the claimed subject matter is not limited in these respects. The angle, α, may be utilized to assist with audio spatial beam steering processing as discussed with respect to FIG. 5, below.

Figure 3A:
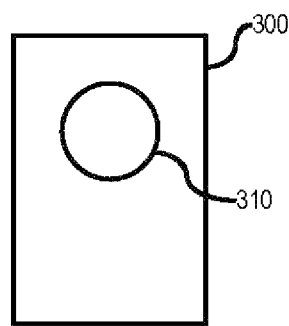
FIG. 3A, FIG. 3B and FIG. 3C are illustrations of a microphone capable of being utilized in the notebook computer of FIG. 1 in accordance with one or more embodiments.
Figure 3B:
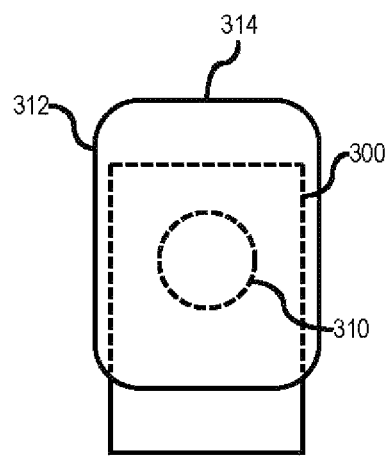
Figure 3C:
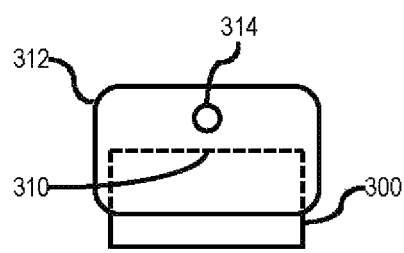

Referring now to FIG. 3A, FIG. 3B and FIG. 3C, illustrations of a microphone capable of being utilized in the notebook computer of FIG. 1 in accordance with one or more embodiments will be discussed. FIG. 3A is a top plan view of an example microphone 300 comprising a microelectromechanical system (MEMS) device that includes a diaphragm 310 that vibrates in response to an audio wave, i.e., sound. The vibration of diaphragm 310 generates an electrical signal that is representative of the audio signal. FIG. 3B is a top plan of microphone 300 further including a boot 312 that is used to cover diaphragm 310 and direct incoming sound to diaphragm 310 entering boot 312 via an opening 314 in boot 312. FIG. 3C is an end elevation view of microphone 300 illustrating the position of the opening 314 in boot 312 with respect to diaphragm 310. In one or more embodiments, the opening 314 in boot 312 is aligned with a respective microphone port 126 or 128 as shown in FIG. 1. Sound waves may enter into a microphone port 126 and into boot 312 via the opening 314. The sound waves may then reflect off the interior of boot 312 to be directed to diaphragm 310 which in turn vibrates in response to the sound waves. Using two or more microphones 300 and two or more microphone ports 126 and 128 allows for a stereo audio signal to be detected. By using boot 312 as shown, the microphone 300 may be mounted on the same circuit board (not shown) as camera 124 within display unit 110. Furthermore, by using stereo signal processing techniques, directional sensitivity may be provided to enhance the strength of the audio signal from the user of notebook computer 100. An example microphone signal processing signal is shown in and described with respect to FIG. 4, below.

Figure 4:
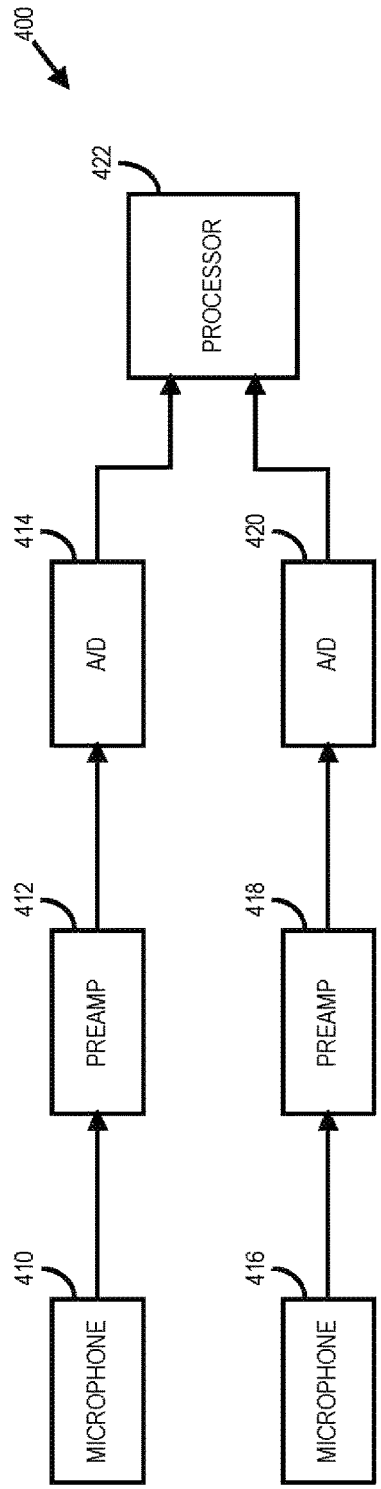
FIG. 4 is a block diagram of a microphone signal processing system in accordance with one or more embodiments.

Referring now to FIG. 4, a block diagram of a microphone signal processing system in accordance with one or more embodiments will be discussed. FIG. 4 illustrates one example of one microphone signal processing system 400 to receive and process microphone signals from one or more microphones 300 coupled with one or more microphone ports 126 and 128 of notebook computer 100 of FIG. 1. As shown in FIG. 4, microphone signal processing system 400 may include two channels corresponding to microphone 410 and microphone 416. Microphones 410 and 416 each may comprise microphone 300 as shown in FIG. 3A, FIG. 3B, and FIG. 3C, above. In a first channel, microphone 410 provides a signal to preamplifier 412 to increase the level of the signal, which in turn provides an amplified signal as an input to analog-to-digital (A/D) converter 414. A/D converter 414 then provides a digital signal to processor 422 which may apply signal processing routines to the digital version of the audio signal. Likewise, in a second channel, microphone 416 provides a signal to preamplifier 418 to increase the level of the signal, which in turn provides an amplified signal as an input to analog-to-digital (A/D) converter 420. A/D converter 420 then provides a digital signal to processor 422 which may apply signal processing routines to the digital version of the audio signal. By having two or more channels of audio signals received via two or more microphones 410 and 416, processor 422 may apply stereo processing routines such as beamforming algorithms to the audio signals, for example to provide spatial filtering to provide directionally dependent sensitivity. Since display unit 110 may be tilted, and the source of the audio from the user's mouth is typically at a 90 degree angle normal to front surface 122, the angle, α, at which display unit 110 is rotated with respect to keyboard unit 112, may be utilized as part of the beam forming algorithm to assist with the desired directional sensitivity. An example microphone input beam steering system is shown in and described with respect to FIG. 5, below.

Figure 5:
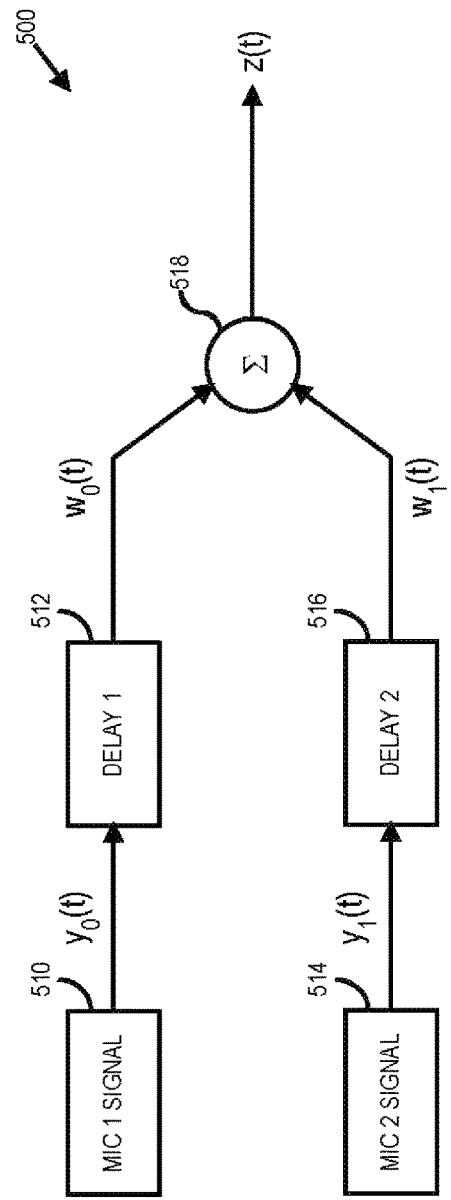
FIG. 5 is a diagram of a microphone input beam steering system in accordance with one or more embodiments.

Referring now to FIG. 5, a diagram of a microphone input beam steering system in accordance with one or more embodiments will be discussed. The microphone input beam steering system 500 of FIG. 5 may be implemented with processor 422 of FIG. 4, for example as a digital signal processing algorithm as one example, and the scope of the claimed subject matter is not limited in this respect. It should be noted that although the processed signals are discussed herein with respect to a continuous time domain, in one or more embodiments the microphone signals may be processed via processing in a discrete time domain, and the scope of the claimed subject matter is not limited in this respect. Microphone input beam steering system 500 may receive a first microphone signal 510 as signal $y_0(t)$ which is delayed in time via a first delay unit 512 to provide a first delayed microphone signal $w_0(t)$. It should be noted that although the processed signals are discussed here with respect to a continuous time domain, in one or more embodiments the microphone signals may be processed via processing in a discrete time domain or processed via conversion to the frequency domain, with processing sub-band processing, and the scope of the claimed subject matter is not limited in this respect. Furthermore, the spacing of microphone port 126 from microphone port 128 by distance, d, may be accommodated in terms of the wavelengths of the sound being processed at a particular frequency or frequency bin of frequencies being processed such that different amounts of delay may be applied for different frequencies or frequency bands. Likewise, microphone input beam steering system may receive a second microphone signal 514 as $y_1(t)$ which is delayed in time via a second delay unit 516 to provide a second delayed microphone signal $w_1(t)$. The two delayed microphone signals are combined via summer 518 to result in a beam steered microphone signal $z(t)$. By selecting an amount of delay provided by first delay unit 512 and/or second delay unit 516, microphone input beam steering system 500 may provide directional sensitivity of the input audio signal so that the sensitivity to the direction of the source of the audio may be increased, maximized, or nearly maximized. The information regarding the tilt angle of the display unit 110 may be provided to microphone input beam steering system 500 to accommodate the tilt angle to assist in the directionality, for example by adjusting the amount of delay provided by first delay unit 512 and/or second delay unit 516. It should be noted that although microphone input beam steering system 500 is shown with two microphone signal channels, additional microphone signal channels may be provided where one or more of the additional channels includes one or more respective delay units, and the scope of the claimed subject matter is not limited in this respect.

Figure 6:
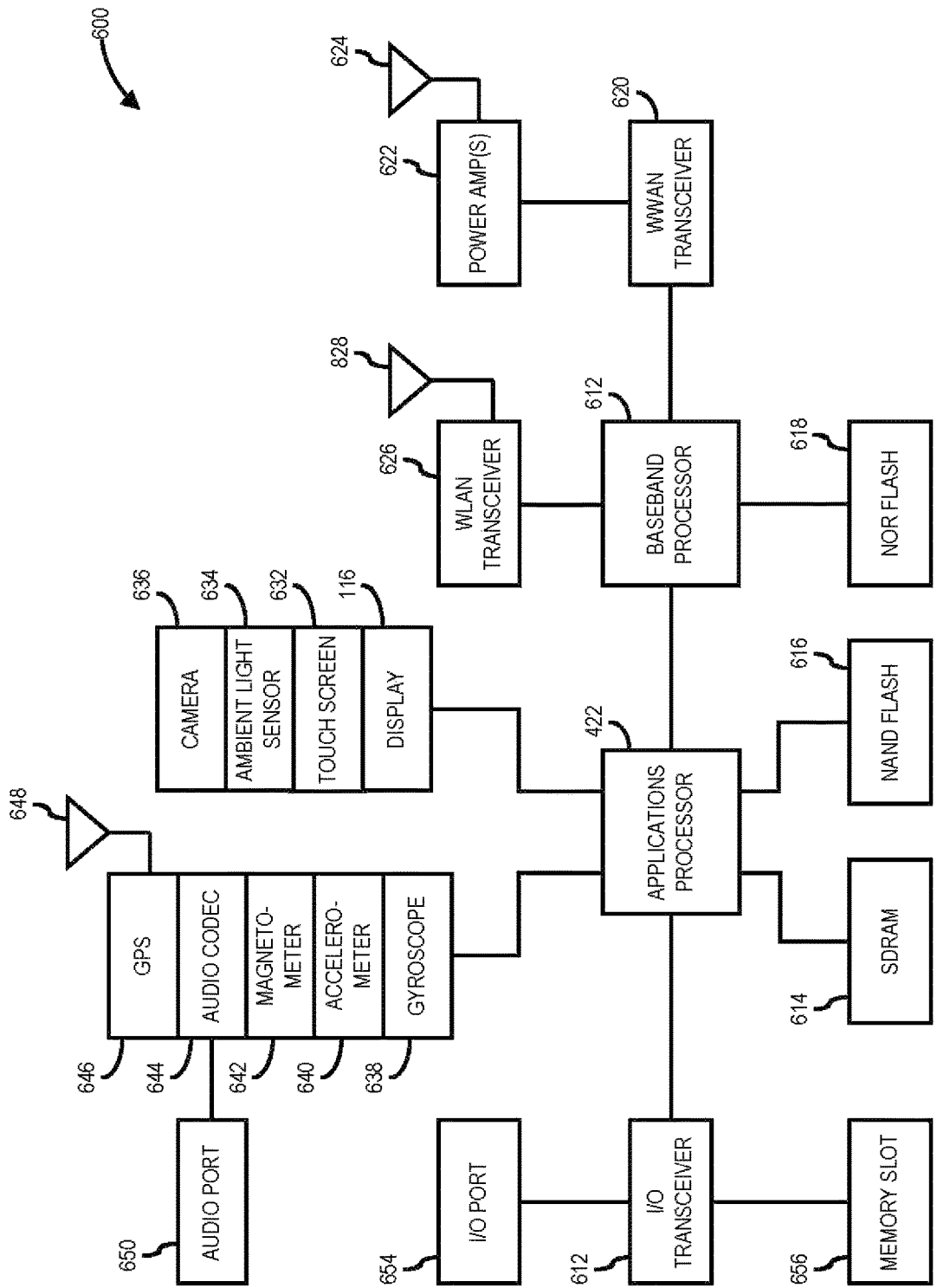
FIG. 6 is a block diagram of an information handling system in accordance with one or more embodiments.

Referring now to FIG. 6, a block diagram of an information handling system in accordance with one or more embodiments will be discussed. Information handling system 600 of FIG. 6 may tangibly embody the electronic systems notebook computer 100 as shown in FIG. 1 with greater or fewer components depending on the hardware specifications of the particular device. Although information handling system 600 represents one example of several types of computing platforms, information handling system 600 may include more or fewer elements and/or different arrangements of elements than shown in FIG. 6, and the scope of the claimed subject matter is not limited in these respects.

In one or more embodiments, information handling system 600 may include an applications processor 422 and a baseband processor 612. Applications processor 422 may be utilized as a general-purpose processor to run applications and the various subsystems for information handling system 600. Applications processor 422 may include a single core or alternatively may include multiple processing cores wherein one or more of the cores may comprise a digital signal processor or digital signal processing (DSP) core. Furthermore, applications processor 422 may include a graphics processor or coprocessor disposed on the same chip, or alternatively a graphics processor coupled to applications processor 422 may comprise a separate, discrete graphics chip. Applications processor 422 may include on board memory such as cache memory, and further may be coupled to external memory devices such as synchronous dynamic random access memory (SDRAM) 614 for storing and/or executing applications during operation, and NAND flash 616 for storing applications and/or data even when information handling system 600 is powered off. In one or more embodiments, instructions to operate or configure the information handling system 600 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 612 may control the broadband radio functions for information handling system 600. Baseband processor 612 may store code for controlling such broadband radio functions in a NOR flash 618. Baseband processor 612 controls a wireless wide area network (WWAN) transceiver 620 which is used for modulating and/or demodulating broadband network signals, for example for communicating via a 3GPP LTE or LTE-Advanced network or the like.

In general, WWAN transceiver 620 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 620 couples to one or more power amps 622 respectively coupled to one or more antennas 624 for sending and receiving radio-frequency signals via the WWAN broadband network. The baseband processor 612 also may control a wireless local area network (WLAN) transceiver 626 coupled to one or more suitable antennas 628 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for applications processor 422 and baseband processor 612, and the scope of the claimed subject matter is not limited in these respects. For example, any one or more of SDRAM 614, NAND flash 616 and/or NOR flash 618 may comprise other types of memory technology such as magnetic memory, chalcogenide memory, phase change memory, or ovonic memory, and the scope of the claimed subject matter is not limited in this respect.

In one or more embodiments, applications processor 422 may drive a display 116 for displaying various information or data, and may further receive touch input from a user via a touch screen 632 for example via a finger or a stylus. An ambient light sensor 634 may be utilized to detect an amount of ambient light in which information handling system 600 is operating, for example to control a brightness or contrast value for display 116 as a function of the intensity of ambient light detected by ambient light sensor 634. One or more cameras 836 may be utilized to capture images that are processed by applications processor 422 and/or at least temporarily stored in NAND flash 616. Furthermore, applications processor may couple to a gyroscope 638, accelerometer 640, magnetometer 642, audio coder/decoder (CODEC) 644, and/or global positioning system (GPS) controller 646 coupled to an appropriate GPS antenna 648, for detection of various environmental properties including location, movement, and/or orientation of information handling system 600. Alternatively, controller 646 may comprise a Global Navigation Satellite System (GNSS) controller. Audio CODEC 644 may be coupled to one or more audio ports 650 to provide microphone input and speaker outputs either via internal devices and/or via external devices coupled to information handling system via the audio ports 650, for example via a headphone and microphone jack. In addition, applications processor 422 may couple to one or more input/output (I/O) transceivers 612 to couple to one or more I/O ports 654 such as a universal serial bus (USB) port, a high-definition multimedia interface (HDMI) port, a serial port, and so on. Furthermore, one or more of the I/O transceivers 612 may couple to one or more memory slots 656 for optional removable memory such as secure digital (SD) card or a subscriber identity module (SIM) card, although the scope of the claimed subject matter is not limited in these respects.

In a first example of the disclosed subject matter, a display housing may comprise a first surface and a second surface opposite to the first surface, wherein the second surface comprises a transparent material covering the second surface and the display housing includes two or more microphone ports disposed along a parting line between the first surface and the second surface exterior to the transparent material. The display housing further may comprising a camera port disposed interior to the transparent material.

In a second example of the disclosed subject matter, a display may comprise a housing comprising a first surface and a second surface opposite to the first surface, wherein the second surface comprises a transparent material covering the second surface and the housing includes two or more microphone ports disposed along a parting line between the first surface and the second surface exterior to the transparent material, and two or more microphones coupled with the two or more microphone ports. One or more of the microphones may include a boot having an opening formed therein aligned with a respective microphone port to direct sound to a diaphragm of a respective microphone. The display further may comprises a camera disposed on a circuit board within the housing interior to the transparent material, wherein the two or more microphones are disposed on the circuit board. The display further may comprise a microphone signal processing system to increase directional sensitivity of the two more microphones toward an audio source. The microphone signal processing system may be capable of increasing directional sensitivity of the two or more microphones via beam forming or spatial filtering. The display further may comprise an angle detector to detect an angle of the housing with respect to gravity or with respect to a keyboard unit, wherein the microphone signal processing system accommodates the detected angle to increase the directional sensitivity of the two or more microphones.

In a third example of the disclosed subject matter, an information handling system may comprise a display unit and a keyboard unit. The display unit may comprise a housing comprising a first surface and a second surface opposite to the first surface, wherein the second surface comprises a transparent material covering the second surface and the housing includes two or more microphone ports disposed along a parting line between the first surface and the second surface exterior to the transparent material, and two or more microphones coupled with the two or more microphone ports. The information handling system further may comprise a hinge to couple the display unit with the keyboard unit, wherein the display unit is able to rotate about an axis of the hinge with respect to the keyboard unit. The information handling system further may comprise a hinge to couple the display unit with the keyboard unit, wherein the display is able to rotate about two axes of the hinge with respect to the keyboard unit. The display unit may be able to be coupled with the keyboard unit, and the keyboard unit may be detachable from the display unit. One or more of the microphones may include a boot having an opening formed therein aligned with a respective microphone port to direct sound to a diaphragm of a respective microphone. The information handling system as further may comprise a camera disposed on a circuit board within the housing interior to the transparent material, wherein the two or more microphones are disposed on the circuit board. The information handling system further may comprise a microphone signal processing system to increase directional sensitivity of the two more microphones toward an audio source. The microphone signal processing system may be capable of increasing directional sensitivity of the two or more microphones via beam forming or spatial filtering. The information handling system further may comprise an angle detector to detect an angle of the display unit with respect to the keyboard unit, wherein the microphone signal processing system accommodates the detected angle to increase the directional sensitivity of the two or more microphones.

In a fourth example of the disclosed subject matter, an article of manufacture may comprise a storage medium having instructions stored thereon that, if executed, result in receiving a first microphone signal from a first microphone responsive to an audio source and having a microphone port disposed proximate to a parting line between a first surface of a display housing and a second surface of the display housing exterior to a transparent material on the second surface of the housing, receiving a second microphone signal from a second microphone responsive to the audio source and having a microphone port disposed proximate to the parting line exterior to the transparent material, delaying at least one of the first microphone signal or the second microphone signal with respect to the other one of the first microphone signal or the second microphone signal, and combining the first and second microphone signals to provide a combined microphone signal, wherein the combined microphone signal exhibits directional sensitivity to the audio source. The instructions, if executed, further may result in detecting an angle of rotation of the display housing with respect to a keyboard unit, and adjusting said delaying based at least in part on the detected angle of rotation. The instructions, if executed, further may result in detecting an angle of rotation of the display housing with respect to gravity, and adjusting said delaying based at least in part on the detected angle of rotation.

Although the claimed subject matter has been described with a certain degree of particularity, it should be recognized that elements thereof may be altered by persons skilled in the art without departing from the spirit and/or scope of claimed subject matter. It is believed that the subject matter pertaining to a microphone system for a notebook computer or the like and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A display housing, comprising:
   a first surface and a second surface opposite to the first surface;
   wherein the second surface comprises a transparent material covering the second surface and the display housing includes one or more microphone ports disposed on a parting line of the display housing between the first surface and the second surface exterior to the transparent material on an interface between the first surface and the second surface, wherein the parting line comprises a corner between the first surface and the second surface; and
   wherein one or more of the microphones includes a boot having an opening formed therein aligned with a respective microphone port to direct sound to a diaphragm of a respective microphone.

2. A display housing as claimed in claim 1, further comprising a camera port disposed interior to the transparent material.

3. A display, comprising:
   a display housing comprising a first surface and a second surface opposite to the first surface;
   wherein the second surface comprises a transparent material covering the second surface and the housing includes one or more microphone ports disposed on a parting line of the display housing between the first surface and the second surface exterior to the transparent material on an interface between the first surface and the second surface, wherein the parting line comprises a corner between the first surface and the second surface; and
   one or more microphones coupled with the one or more microphone ports;
   wherein one or more of the microphones includes a boot having an opening formed therein aligned with a respective microphone port to direct sound to a diaphragm of a respective microphone.

4. A display as claimed in claim 3, further comprising a camera disposed on a circuit board within the housing interior to the transparent material, wherein the one or more microphones are disposed on the circuit board.

5. A display as claimed in claim 3, further comprising a microphone signal processing system to increase directional sensitivity of the one or more microphones toward an audio source.

6. A display as claimed in claim 5, wherein the microphone signal processing system is capable of increasing directional sensitivity of the one or more microphones via beam forming or spatial filtering.

7. A display as claimed in claim 5, further comprising an angle detector to detect an angle of the housing with respect to gravity or with respect to a keyboard unit, wherein the microphone signal processing system accommodates the detected angle to increase the directional sensitivity of the one or more microphones.

8. An information handling system, comprising:
   a display unit; and
   a keyboard unit;
   wherein the display unit comprises:
      a display housing comprising a first surface and a second surface opposite to the first surface;
      wherein the second surface comprises a transparent material covering the second surface and the housing includes one or more microphone ports disposed on a parting line of the display housing between the first surface and the second surface exterior to the transparent material on an interface between the first surface and the second surface, wherein the parting line comprises a corner between the first surface and the second surface; and
      one or more microphones coupled with the one or more microphone ports;
      wherein one or more of the microphones includes a boot having an opening formed therein aligned with a respective microphone port to direct sound to a diaphragm of a respective microphone.

9. An information handling system as claimed in claim 8, further comprising a hinge to couple the display unit with the keyboard unit, wherein the display unit is able to rotate about an axis of the hinge with respect to the keyboard unit.

10. An information handling system as claimed in claim 8, further comprising a hinge to couple the display unit with the keyboard unit, wherein the display is able to rotate about two axes of the hinge with respect to the keyboard unit.

11. An information handling system as claimed in claim 8, wherein the display unit is able to be coupled with the keyboard unit, and the keyboard unit is detachable from the display unit.

12. An information handling system as claimed in claim 8, wherein one or more of the microphones includes a boot having an opening formed therein aligned with a respective microphone port to direct sound to a diaphragm of a respective microphone.

13. An information handling system as claimed in claim 8, further comprising a camera disposed on a circuit board within the housing interior to the transparent material, wherein the one or more microphones are disposed on the circuit board.

14. An information handling system as claimed in claim 8, further comprising a microphone signal processing system to increase directional sensitivity of the one or more microphones toward an audio source.

15. An information handling system as claimed in claim 14, wherein the microphone signal processing system is capable of increasing directional sensitivity of the one or more microphones via beam forming or spatial filtering.

16. An information handling system as claimed in claim 14, further comprising an angle detector to detect an angle of the display unit with respect to the keyboard unit, wherein the microphone signal processing system accommodates the detected angle to increase the directional sensitivity of the one or more microphones.

17. An article of manufacture comprising a non-transitory storage medium having instructions stored thereon that, if executed, result in:
   receiving a first microphone signal from a first microphone responsive to an audio source and having a microphone port disposed on a parting line between a first surface of a display housing and a second surface of the display housing exterior to a transparent material on the second surface of the housing on an interface between the first surface and the second surface, wherein the parting line comprises a corner between the first surface and the second surface;
   receiving a second microphone signal from a second microphone responsive to the audio source and having a microphone port disposed on the parting line exterior to the transparent material;
   wherein one or more of the microphones includes a boot having an opening formed therein aligned with a respective microphone port to direct sound to a diaphragm of a respective microphone;
   delaying at least one of the first microphone signal or the second microphone signal with respect to the other one of the first microphone signal or the second microphone signal; and
   combining the first and second microphone signals to provide a combined microphone signal;
   wherein the combined microphone signal exhibits directional sensitivity to the audio source.

18. An article of manufacture as claimed in claim 17, wherein the instructions, if executed, further result in:
   detecting an angle of rotation of the display housing with respect to a keyboard unit; and
   adjusting said delaying based at least in part on the detected angle of rotation.

19. An article of manufacture as claimed in claim 17, wherein the instructions, if executed, further result in:
   detecting an angle of rotation of the display housing with respect to gravity; and
   adjusting said delaying based at least in part on the detected angle of rotation.

* * * * *